Aug. 10, 1965 G. L. RUSH 3,200,370
WARNING DEVICE TO INDICATE AN UNFASTENED SEAT BELT
Filed April 16, 1962
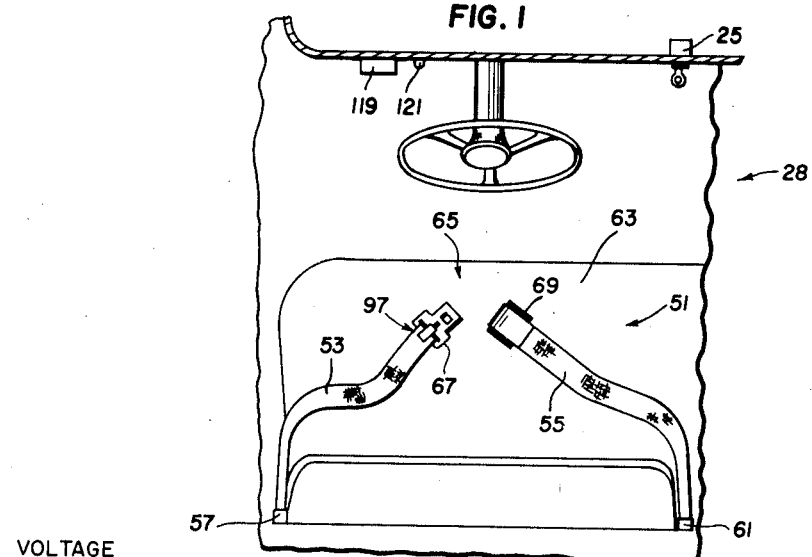
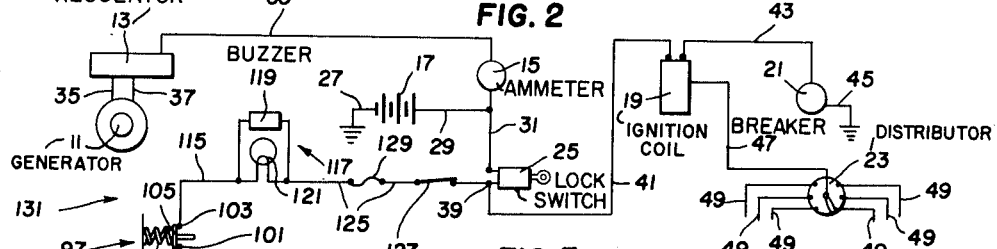
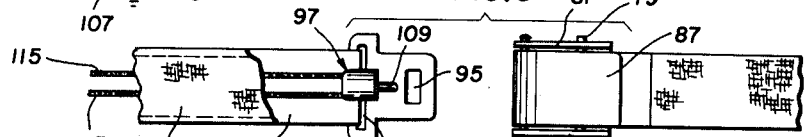
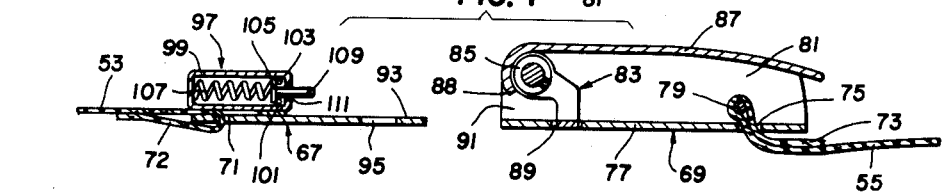
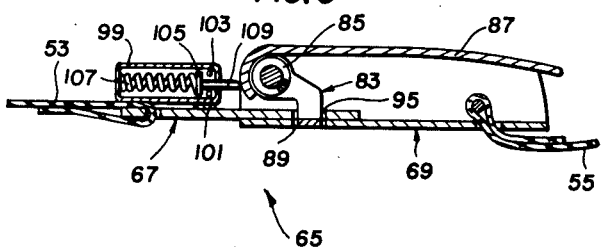
INVENTOR.
GEORGE L. RUSH
BY John R. Walker, III
Attorney

United States Patent Office 3,200,370
Patented Aug. 10, 1965

3,200,370
WARNING DEVICE TO INDICATE AN
UNFASTENED SEAT BELT
George L. Rush, 5008 Acorn Drive, Memphis, Tenn.
Filed Apr. 16, 1962, Ser. No. 187,601
4 Claims. (Cl. 340—52)

This invention relates to a means for warning that a seat belt in an automobile is in an unfastened condition.

It is well known that when seat belts are used in an automobile, there is a sharp decrease in the possibilities of serious injuries to persons who were using seat belts at the time of an accident. Even knowing this, there are a great many people who, although they have seat belts installed in their cars, will forget or neglect to fasten them. Also, there are many people who, with good intentions, will go through the motions of attempting to fasten the seat belt, and will bring the locking elements together, but, without knowing it, will not completely urge the elements into a fully caught or locked position, so that the seat belt is not secured and will not serve the purpose for which intended.

Thus, one of the objects of the present invention is to provide means for reminding a person to fasten his seat belt and for letting him know when it is securely fastened.

A further object is to provide such means which includes visual or audible signal means that is activated responsive to the person turning the ignition switch of the automobile to an on position.

A further object is to provide such means that continues to remind or warn the person until the locking elements of the seat belt lock have been brought into such a position that the lock is completely fastened.

The means by which the foregoing and other objects of the present invention are accomplished and the manner of their accomplishment will be readily understood from the following specification upon reference to the accompanying drawings, in which:

FIG. 1 is a fragmentary plan view of an automobile using the present invention, with parts broken away for purposes of illustration.

FIG. 2 is a schematic view showing the present invention in conjunction with the ignition system of an automobile.

FIG. 3 is an enlarged fragmentary plan view of a seat belt employing the present invention and with portions being broken away for purposes of illustration, and with the seat belt shown in an unfastened condition.

FIG. 4 is a further enlarged sectional view of the device of FIG. 3 shown as taken on a longitudinal vertical plan through the middle thereof, and with parts being removed for purposes of clarity.

FIG. 5 is a view similar to FIG. 4 but showing the lock in a securely fastened or locked position.

Referring now to the drawings in which the various parts are indicated by numerals, in FIG. 2 is shown a typical ignition system of an automobile. In the system shown, only the basic components have been included for purposes of clarity and these components include a generator 11, a current and voltage regulator 13, an ammeter 15, a battery 17, an ignition coil 19, a breaker 21, a distributor 23, and an ignition lock-switch 25.

The above mentioned components are shown in the drawings connected as follows: A conductor 27 grounds one side of battery 17 to a suitable ground connection on the vehicle 28. A conductor 29 is connected to a conductor 31 that is interposed between ammeter 15 and one terminal of lock-switch 25. Ammeter 15 is connected to current and voltage regulator 13 by a conductor 33 and current and voltage regulator 13 is connected to generator 11 by conductors 35 and 37. The ignition terminal 39 of lock-switch 25 is connected to ignition coil 19 by a conductor 41. Ignition coil 19 is also connected to breaker 21 by a conductor 43 and the breaker is grounded by conductor 45. A conductor 47 joins ignition coil 19 with distributor 23 where the conductors 49 lead from the distributor to the individual spark plugs, not shown.

In vehicle 28, a seat belt 51 of usual construction is provided, which includes straps 53, 55 with one end of each of the straps respectively being fixedly attached to the vehicle 28 respectively at the places designated 57, 61. Seat belt 51 is arranged in the usual manner to extend over seat 63 and is provided with a lock 65 for fastening the free ends of straps 53, 55 together to hold a person in place on seat 63 with the belt strapped around his waist. Lock 65 is of the so-called metal-to-metal type, as opposed to the belt and buckle type, with one preferable or typical construction being shown in the drawings which includes locking elements 67, 69 respectively attached adjacent the free ends of straps 53, 55 and arranged to co-act to hold the straps together. Strap 53 is attached to locking element 67 in any suitable manner such as extending the end of the strap through a slot 71 provided in the locking element, then doubling the strap back upon itself as at 72 and securing the end thereof to the main body of the strap as by stitching or the like. Likewise, strap 55 is secured to locking element 69 in a suitable manner, as for example, by extending the loop 73 of strap 55 through a slot 75 in the base 77 of locking element 69 where the loop is held in place by means of a rod 79 extending between the upstanding spaced sides 81 of the locking element 69, in the usual manner. The usual catch 83 is pivotally mounted in locking element 69 and is urged in a clockwise direction, as viewed in FIGS. 4 and 5, by means of the usual spring 85. The usual stop means, not shown, is provided for stopping the catch 83 in the position seen in FIGS. 4 and 5. The usual handle 87 is pivotally mounted between upstanding sides 81 and is arranged in the usual manner so that upward pull on the right end of handle 87, as viewed in FIGS. 4 and 5, to rotate the handle in a counterclockwise direction, will cause the portion 88 of the handle to engage catch 83 to rotate the catch counterclockwise and withdraw the catch from an opening 89 provided in base 77. This is for the purpose of unlocking lock 65, which will be better understood in the following description of the operation of lock 65.

With the locking elements 67 and 69 in the positions shown in FIGS. 3 and 4, the locking elements are brought together so that locking element 67 is caused to enter the space 91 in locking element 69 which is between handle 87 and base 77. Further movement of the locking elements 67, 69 together will cause the locking element 67 to engage catch 83 and urge it counterclockwise against the tension of spring 85. Continued movement of the locking element 67 will cause the catch 83 to slide on the top surface 93 of locking element 67 until the opening 95 through locking element 67 is in alignment with opening 89 whereupon catch 83 will rotate clockwise into these openings and lock the two elements together, as best seen in FIG. 5.

Although in the drawings only the seat belt 51 in the driver's seat is shown, it will be understood that the invention hereinafter described can be applied to the passenger seat belts, not shown, without departing from the spirit and scope of the present invention.

In carrying out the present invention in conjunction with the above described typical ignition system and typical seat belt 51, a switch 97 is fixedly mounted on locking element 67. Switch 97 is normally closed but is actuated to an open position responsive to movement of the locking elements 67, 69 into a fully locked position, as heretofore described. Thus, the switch 97 preferably comprises a casing 99, which is the part of the switch that is actually attached to locking element 67. In casing 99 is provided a pair of insulated electrical contacts 101, 103 which are bridged by an electrical conductive element 105, when the switch is closed, as shown in FIG. 4. Element 105 is urged into this bridged or closed condition by a spring 107 extending between the interior of the casing and the back of element 105. A plunger 109 is attached to element 105 and extends slidably outward through an aperture 111 in casing 99 and therebeyond in position to be contacted by locking element 69. The parts are arranged so that locking elements 67, 69 must be in a fully locked position before the switch 97 is opened. A conductor 113 leads from electrical contact 101 to ground, and another conductor 115 leads from electrical contact 103 to a visual or audible signal means 117, such as a buzzer 119 and/or, if desired, a light 121. Conductors 113, 115 are preferably of the braided type, such as that commonly found in airplanes, so that regardless of the amount of bending of the strap 53 the conductors will not break. Also, the conductors 113, 115 are preferably attached to the strap 53 by sewing an extra layer 123 of material over the strap, as shown by a portion thereof in FIG. 3. Another conductor 125 leads from signal means 117 to terminal 39 on lock-switch 25. An off-on switch 127 and a fuse 129 are preferably, though not necessarily, interposed in series in conductor 125. During the normal operation of the device of the present invention, it will be understood that switch 127 will be kept in the on position. Also, it will be understood that there is no danger of a direct short circuit of battery 17 to ground through the conductors on strap 53. For example, if through inadvertence or malfunctioning, conductors 113 and 115 should happen to touch together, battery 17 will not be shorted since the current would have to pass through signal means 117.

In the operation of the device of the present invention the following sequence of events will take place. When the person gets into vehicle 28 and turns on the ignition lock-switch 25 and if he has not yet fastened seat belt 51, then signal means 117 will be actuated. This actuation of signal means 117 will take place because of the fact that when ignition lock-switch 25 is turned on there will be an electrical potential at terminal 39 relative to the vehicle ground, since the switch when turned on connects electrically the circuit from conductor 31 to the terminal 39. Thus, current will flow through the auxiliary circuit 131 to ground by the following path: conductor 125 and switch 127 and fuse 129 interposed in the conductor, signal means 117, conductor 115, switch 97, and conductor 113. It will be understood that just as soon as locking element 67 is moved into the completely locked position with element 69, as shown in FIG. 5, the switch 97 will be opened which will break the path to ground and de-activate signal means 117. It will be understood that this de-activation of signal means 117 will not occur *unless* the lock 65 is *securely* locked. The importance of this feature can be appreciated when it is considered that without the present invention a dangerous condition could exist and the person would never know about it. For example, a person might think that his seat belt is securely fastened when the element 67 is only partially moved into position in element 69, as when the catch 83 is engaging portion 93. However, with the use of the present invention, such a condition would be immediately apparent to the person since signal means 117 would be still activated.

I claim:
1. In a vehicle of the type in which is provided an ignition system having a ground and including an ignition lock-switch positionable from an off position to an on position and said ignition lock-switch having an ignition terminal provided with an electrical potential relative to said ground when said ignition lock-switch is in said on position, a seat belt including a pair of straps, said straps respectively being fixedly attached to said vehicle adjacent one end of each of said straps and having opposite free ends, a lock for locking said free ends together and including a pair of locking elements respectively attached to said straps adjacent the free ends thereof, normally closed switch means attached to one of said locking elements and including a plunger engageable by the other locking element, electrically actuated signal means operable between an inactive condition and an active condition in which a positive alarm is provided; first circuit means connected between said ignition terminal and said ground for establishing a first path of electricity activating said signal means when said ignition lock-switch is on and said seatbelt is unfastened; said circuit means including, in series, an electrical conductor connected between said ignition terminal and said signal means, a second electrical conductor connected between said signal means and said switch means, and a third electrical conductor connected between said switch means and said ground; said plunger of said switch means being urgeable by said other of said locking elements into a position to open said switch means when said other of said locking elements is in a fully locked position relative to said one of said locking elements, said ignition system including a second circuit means connected between said ignition terminal and said ground for establishing a path of electricity separate from said first path to normally activate said ignition system of the vehicle when said ignition lock-switch is in said on position and regardless of the position of said switch means.

2. In a vehicle of the type provided with a sealt belt including fastening means for fastening and unfastening said seat belt, and an ignition system including an ignition lock-switch positionable from an off position into an on position; safety means for indicating an unfastened condition of said seat belt after said lock-switch has been positioned to an on position comprising an auxiliary circuit means including a signal means operable between an inactive condition and an active condition in which a positive alarm is provided, said auxiliary circuit means being coupled to said ignition system for establishing a first path for electricity from said ignition system and being energizable when said seat belt is unfastened responsive to the positioning of said lock-switch to said on position to activate said signal means, said auxiliary circuit additionally including normally closed switch means in series with said signal means, said switch means being actuated to an open position responsive to fastening of said seat belt, and said signal means being deactivated responsive to actuation of said switch means to an open position, said ignition system including circuit means for establishing a path of electricity separate from said first path to normally activate said ignition system of the vehicle when said ignition lock-switch is in said on position and regardless of the position of said switch means.

3. In a vehicle of the type in which is provided an ignition system having a ground and including an ignition lock-switch positionable from an off position to an on postion and said ignition lock-switch having an ignition terminal provided with an electrical potential relative to said ground when said ignition lock-switch is in said on position, a seat belt including a pair of straps, said straps respectively being fixedly attached to said vehicle adjacent one end of each of the straps and having opposite free ends, a lock for locking said free ends together and including a pair of locking elements respectively attached to said straps adjacent the free ends thereof, said pair of locking elements respectively being provided with openings therethrough, said locking elements being movable together to carry said openings into alignment, a catch pivotally mounted in one of said locking elements and movable into said openings when said openings are in alignment to fasten said lock, switch means attached to one of said locking elements and including a plunger engageable by the other locking element, electrically actuated signal means operable between an inactive condition and an active condition in which a positive alarm is provided; first circuit means connected between said ignition terminal and said ground for establishing a first path of electricity activating said signal means when said ignition lock-switch is on and said seat belt is unfastened; said first circuit means including, in series, an electrical conductor connected between said ignition terminal and said signal means, a second electrical conductor connected between said signal means and said switch means, and a third electrical conductor connected between said switch means and said ground; said plunger being urgeable by said other of said locking elements into a position to open said switch means and render said signal means inoperable when said openings are in alignment and said lock is fully locked, and said switch means being normally closed except when said openings are in alignment whereby said signal means warns when said seat belt is not completely fastened and said ignition lock-switch is on, said ignition system including a second circuit means connected between said ignition terminal and said ground for establishing a path of electricity separate from said first path to normally activate said ignition system of the vehicle when said ignition lock-switch is in said on position and regardless of the position of said switch means.

4. The device according to claim 3 including an off-on switch interposed in said first electrical conductor in series with said switch means.

References Cited by the Examiner

UNITED STATES PATENTS

| 2,510,115 | 6/50 | Jakowsky | 340—282 |
| 2,802,073 | 8/57 | Simon | 200—61.08 |
| 2,996,587 | 8/61 | McCarthy | 340—278 XR |
| 3,074,055 | 1/63 | Rudolph et al. | 340—520 X |

NEIL C. READ, *Primary Examiner.*

BENNETT G. MILLER, ROBERT H. ROSE,
*Examiners.*